United States Patent

Berman et al.

[15] 3,701,102

[45] Oct. 24, 1972

[54] NOISE ERROR CORRECTING AND EXCESSIVE NOISE REJECTING SYSTEM

[72] Inventors: Max Berman; Gary W. Bowen, both of Roanoke, Va.

[73] Assignee: General Electric Company

[22] Filed: May 3, 1971

[21] Appl. No.: 139,662

[52] U.S. Cl. ....................340/168 R, 340/32

[51] Int. Cl. ....................G08b 29/00, G08g 1/00

[58] Field of Search.........340/146.1, 31, 32, 51, 168; 343/6.5; 325/312, 323, 325, 41, 42

[56] References Cited

UNITED STATES PATENTS

| | | | |
|---|---|---|---|
| 3,523,278 | 8/1970 | Hinkel | 340/146.1 BA |
| 3,257,640 | 6/1966 | Beaven | 340/51 X |

*Primary Examiner*—Donald J. Yusko
*Attorney*—Arnold E. Renner, James C. Davis, Jr., Frank L. Neuhauser, Oscar B. Waddell and Joseph B. Forman

[57] ABSTRACT

A noise error correcting and excessive noise error rejection system for use preferably in an identification interrogation system in which a scanned or swept frequency spectrum is transmitted and certain discrete frequencies are reradiated depending upon the frequency of tuned circuits located on the object to be identified. The system uses a constant number of bits out of a larger number of bit positions for all symbols or digits used. A check for excessive noise is made by counting the number of bits per digit or symbol received on a first sweep. Excessive noise is defined as a predetermined excess of bits in a predetermined number of digits. On a second sweep, the data received on the first sweep is corrected and further checks to insure accuracy are made.

7 Claims, 5 Drawing Figures

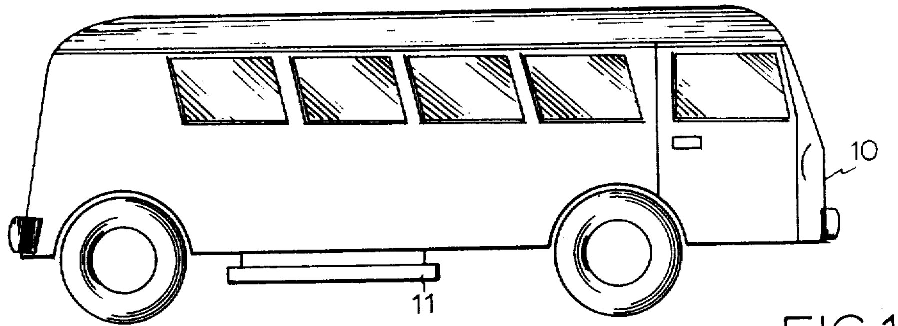
FIG.1
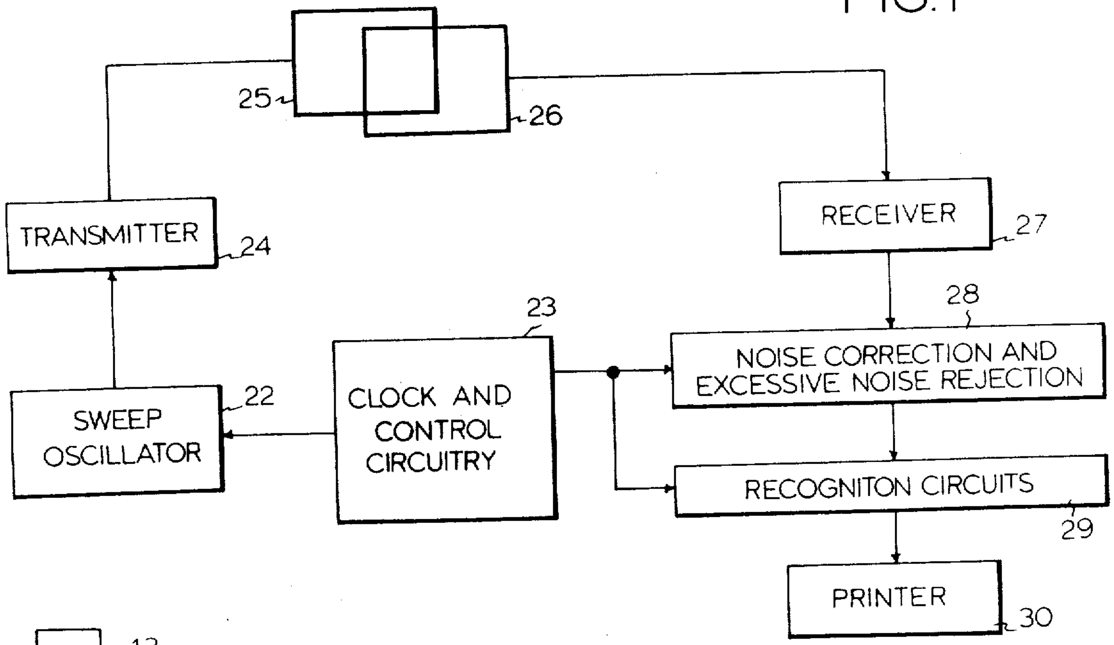
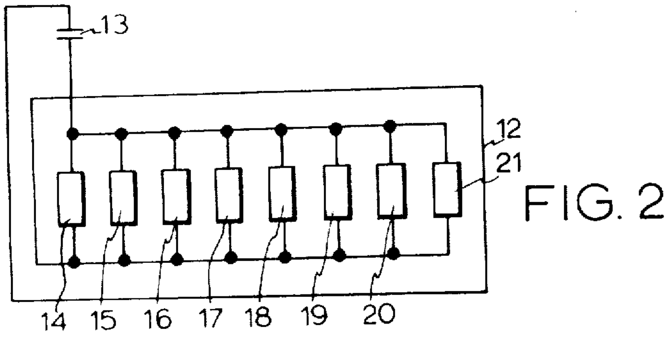
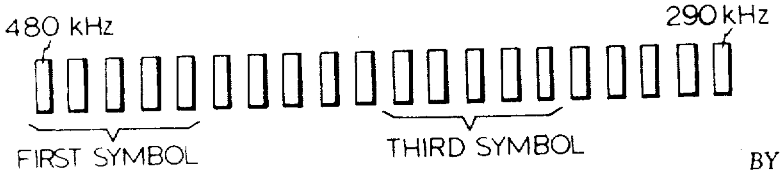
FIG.3
INVENTORS
MAX BERMAN
GARY W. BOWEN
BY

NOISE ERROR CORRECTING AND EXCESSIVE NOISE REJECTING SYSTEM

BACKGROUND OF THE INVENTION

This invention relates to a noise error correcting and excessive noise rejecting system. More particularly, this invention relates to a noise error correcting and excessive noise rejecting system which may preferably be used in an identification interrogation system using reradiated frequency signals in an electromagnetic noise environment, such as for example, in monitoring automotive vehicles using a toll road.

An identification interrogation system in which the invention may preferably be used utilizes the transmitting of a spectrum of frequencies in a frequency sweep. Each object to be identified carries a signal repeating device. The signal repeating device may be comprised of one or more piezoelectric elements connected in series with a capacitor and a loop antenna. When an instantaneous frequency of the frequency sweep equals the resonant frequency of one of the piezoelectric elements, the signal repeating device is used to resonate and reradiate that particular instantaneous frequency. This reradiated frequency is picked up by an antenna and processed in a receiver. When this invention is used, the output of the receiver is fed through noise correction and rejection circuits to signal recognition circuits. The noise correction and rejection circuits and the signal recognition circuits and the sweep oscillator circuit are synchronized by clock and control circuitry. The output of the signal recognition circuits is fed to any suitable output device which may be a printer.

Identification interrogation systems of the type described above have been successfully used in monitoring the movement of railroad cars without any noise error correcting and excessive rejecting system. However, the use of such systems without noise error correction and excessive noise rejection systems in high electromagnetic noise environments has not been as successful. For example, it is desirable to have an automatic means for monitoring the number of times repetitive users of toll roads and bridges, such as buses and trucks, pass through a toll gate. However, in such environments there is usually a considerable amount of electromagnetic noise generated from automotive ignition systems and other sources such as radio transmitting and receiving equipment. Noise generated by ignition systems or other sources may cause an erroneous reading. That is, in an excessive noise environment, a signal may be returned for each possible bit position and therefore the output of the signal recognition circuitry would be completely arbitrary without an excessive noise rejection circuit. Assuming such an identification system were to be used for billing tolls, this would result in billing the wrong party or no party at all because of an unassigned or erroneous account number. The noise error correcting and excessive noise rejection system of this invention reduces erroneous readings or print-outs to a minimum by rejecting a reading when there is excessive noise, and correcting a reading when there is less than a predetermined amount of noise.

DESCRIPTION OF THE PRIOR ART

Identification interrogation systems of the type described above without noise error correction and excessive noise rejection systems have been known in the prior art. It has also been known in the prior art to gate received signals only during the time that the transmitter is transmitting a frequency equal to a frequency that could possibly be reradiated. Although this arrangement eliminates the reception of noise signals during the time that the transmitter is sweeping a frequency between possible frequencies of the signal repeating device, it does not correct for or reject excessive noise caused by the occurrence of noise at frequencies of a possible piezoelectric element which is not present in the particular signal repeating device being irradiated.

SUMMARY OF THE INVENTION

Briefly, the essence of this invention comprises a noise error correcting and excessive noise rejecting system. The system uses a code in which all symbols in the code require the same number of bits out of a larger predetermined number of bit positions for each symbol. Excessive noise is defined as a predetermined number of bits on a predetermined number of digits or symbols. Means are provided to check for excessive noise on a first reading or frequency sweep. If excessive noise is detected on a sweep, the received data is rejected. If excessive noise is not encountered on the first reading or frequency sweep, the data from the first sweep is stored and then corrected by comparison means which compares the first sweep stored data with data received on a second reading or sweep. Checks are made on data received on the second sweep to insure that excessive noise is not encountered on the second sweep. Means are also provided for checking the first sweep corrected data to insure that each symbol position has exactly the correct number of bits.

BRIEF DESCRIPTION OF THE DRAWINGS

While the specification concludes with claims particularly pointing out and distinctly claiming the subject matter which is regarded as the invention, it is believed that the invention will be better understood from the following description taken in connection with the accompanying drawings in which:

FIG. 1 is a combination drawing and block diagram locating the invention in an identification interrogation system;

FIG. 2 is a schematic diagram of a signal repeating device used in FIG. 1;

FIG. 3 is a representation of a series of discrete frequencies which may be used in the identification interrogation system;

DESCRIPTION OF AN EMBODIMENT OF THE INVENTION

Figure 4:
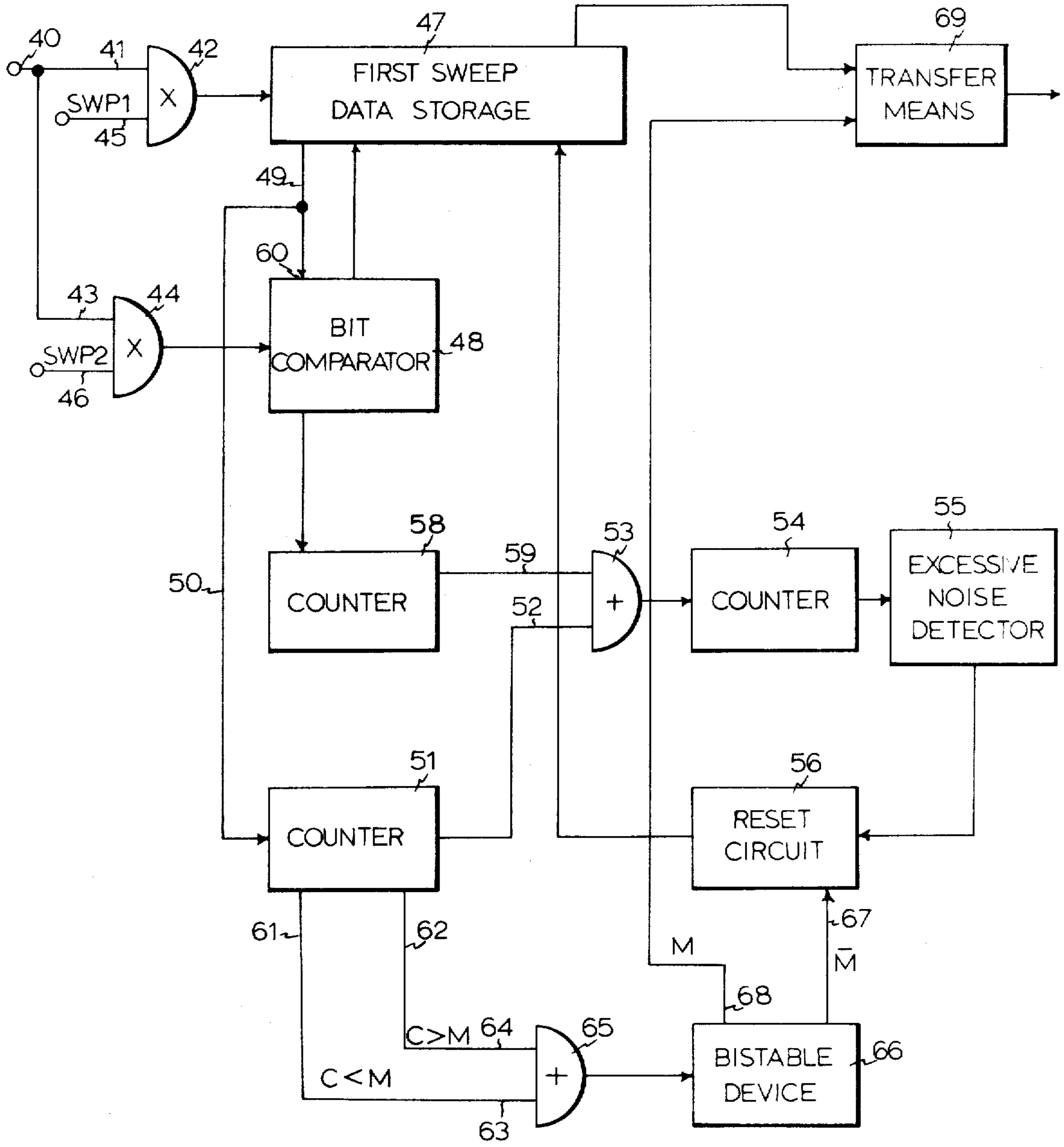
FIG. 4 shows a diagram of the invention partially in block diagram form.

Referring now more particularly to FIG. 1, there is shown an automotive bus 10 having a signal repeating device 11 mounted thereto. The signal repeating device 11 is shown with more particularity in FIG. 2. There is shown in FIG. 2 a loop antenna 12, a capacitor 13 and eight piezoelectric elements 14–21 connected in parallel. The capacitor 13, the loop antenna 12 and any one of the piezoelectric elements 14–21 form a series resonant circuit when irradiated with a frequency equal to the resonant frequency of one of the piezoelectric elements 14–21.

Referring again to FIG. 1, there is shown a sweep oscillator 22 whose timing is controlled by clock and control circuitry 23. The output of the sweep oscillator 22 is fed to a transmitter 24 where it is amplified and fed to transmitting antenna 25. The sweep oscillator 22 sweeps a spectrum of frequencies. The breadth of the frequency spectrum selected depends upon a number of various factors including the number of bits per symbol desired, the number of symbols desired to identify one particular object, and the frequency spacing between possible discrete frequencies. For purposes of illustration, a frequency spectrum of from 290 kilohertz to 480 kilohertz has been selected. In actual practice, the frequencies are swept from 480 kilohertz down to 290 kilohertz. Also, for purposes of illustration, the spacing between possible discrete frequencies has been selected to be 10 kilohertz. Referring to FIG. 3, there is shown a frequency domain diagram in which twenty discrete frequencies are depicted in the frequency range from 480 kilohertz to 290 kilohertz, each being separated by 10 kilohertz. As shown in FIG. 3, the first five discrete frequencies are used to constitute a word for the first symbol. Thus, the 20 discrete frequencies may be used to constitute four symbols. However, it is noted that a word may be constituted from any suitable number of bit positions. A five bit word is chosen merely for illustrative purposes.

Any suitable code having a constant number of bits per symbol desired may be used. For purposes of illustration, a two out of five code is chosen. The five bit positions of this code are weighted 1, 2, 4 7 and check, respectively. A table showing the position of the two bits of each decimal number from 0 through 9 is shown below. An X is used to indicate the presence of a bit or a binary "1" and a 0 is used to indicate the absence of a bit or a binary "0".

| Decimal | 1 | 2 | 4 | 7 | c |
|---|---|---|---|---|---|
| 0 | 0 | 0 | X | X | 0 |
| 1 | X | 0 | 0 | 0 | X |
| 2 | 0 | X | 0 | 0 | X |
| 3 | X | X | 0 | 0 | 0 |
| 4 | 0 | 0 | X | 0 | X |
| 5 | X | 0 | X | 0 | 0 |
| 6 | 0 | X | X | 0 | 0 |
| 7 | 0 | 0 | 0 | X | X |
| 8 | X | 0 | 0 | X | 0 |
| 9 | 0 | X | 0 | X | 0 |

Referring again to FIG. 1, there is shown an antenna 26 which receives the reradiated discrete frequency signals from signal repeating device 11. The output of antenna 26 is fed to receiver 27 which in turn feeds pulses to a noise correction and rejection system 28. The pulse after being corrected for error, due to a limited amount of noise, are fed to recognition circuits 29. Both the noise error correction and excessive noise rejection system 28 and recognition circuits 29 receive clock and control inputs from the clock and control circuitry 23. The output of the recognition circuit is fed to any suitable output device such as printer 30 which records the identified vehicles or objects.

Referring now to FIG. 4, there is shown a block diagram of the noise error correcting and excessive noise rejecting system of the invention in block diagram form. Input terminal 40 receives signal pulses from the output of receiver 27 shown in FIG. 1. For the two out of five code described above and for a signal repeating device 11 which is capable of producing four identifying symbols as shown in FIG. 2, terminal 40 would receive eight pulses per frequency sweep of sweep oscillator 22 of FIG. 1. The signal pulses on terminal 40 are applied to input 41 of AND gate 42 and input 43 of AND gate 44. A control signal SWP1 provides a "1" condition during the first sweep of sweep oscillator 23. Control signal SWP1 is applied to input terminal 45 of AND gate 42. A control signal SWP2, which indicates that sweep oscillator 22 is producing a second sweep, is applied to input terminal 46 of AND gate 44. Thus, the return signal pulses on the first sweep are fed through AND gate 42 to a first sweep data storage means 47, and return signal pulses on the second sweep are fed through AND gate 44 to bit comparator 48. The first sweep data storage means 47 is a recirculating type of storage unit. As the pulses from the AND gate 42 are read into first sweep data storage means 47, the condition of the first, second or any other suitable bit position is monitored and the condition thereof is fed by terminal 49 and line 50 to counter means 51.

Counter means 51 counts the number of bits per each word or symbol on the first sweep. Counter means 51 provides an output pulse to input terminal 52 of OR gate 53 each time a predetermined number of bits are counted in any one word. For example, in the two out of five code described above, excessive noise may be defined as four bits on any three digits. Therefore as a specific example, counter 51 would produce a pulse on input terminal of OR gate 53 each time four bits were counted on any one word, digit or symbol. The output of OR gate 53 is fed to counter 54 which counts the number of digits having four or more data bits. The count in counter 54 is monitored by excessive noise detector 55 which provides a pulse to reset circuit 56 when a count equal to that defined to be excessive noise is reached. Upon occurrence of an excessive noise condition, reset circuit 56 provides a master reset pulse on line 57 at the end of the sweep to reset or destroy the data stored in the first sweep data storage means 47.

If the data received in the first sweep does not contain excessive noise, a second sweep will be generated by sweep oscillator 22 of FIG. 1, and the returned signal pulse on terminal 40 will be applied through AND gate 44 to bit comparator 48. While bit comparator 48 is receiving the returned signal pulses on the second sweep, it is also comparing the signal pulses received with corresponding pulses stored in first sweep data storage means 47. If no pulse is received on the second sweep for a particular bit position, and there is a pulse stored in the corresponding position in first sweep data storage means 47, the pulse stored in the corresponding position in first sweep data storage means 47 is cancelled. Pulses are never set into a position in first sweep data storage means 47 on the second sweep, but are cancelled when a corresponding signal pulse is missing on the second sweep. The reason pulses are cancelled and never added is that electromagnetic noise energy may create an extraneous and unwanted pulse, but will not remove a pulse that is created by proper operation.

As the pulses are received in bit comparator 48, they are counted in counter 58. Counter 58 supplies a pulse to input 59 of OR gate 53 whenever an excessive number of pulses is counted in any particular word, symbol or digit in a manner similar to the operation of counter 51. The output pulse of counter 58 which indicates an excessive number of bits per word is then fed through OR gate 53 to counter 54. Counter 54, excessive noise detector 55 and reset circuit 56 operate as described above to reset or destroy the data stored in the first sweep data storage means 47 if excessive noise is detected on the second sweep data.

During the comparison operation of bit comparator 48, the signal data stored in first sweep data storage means 47 is recirculated and the condition of one of the bit positions is sensed. This condition is present on terminal 49 of first sweep data storage means 47. This condition is fed to input terminal 60 of bit comparator 48, and via line 50 to counter means 51. Counter means 51 then counts the number of bits per word in first sweep data storage means 47 and produces an output pulse on line 61 if the count at the end of each word is less than the number of bits required for each word, and produces a pulse on line 62 if the count is greater than the number of bits required for each word. The output pulses on lines 61 and 62 are fed to inputs 63 and 64 of OR gate 65, respectively. The output of OR gate 65 is used to set a bistable circuit or device 66. An output from OR gate 65 produces a pulse on line 67 which causes reset circuit 56 to reset or destroy the data stored in first sweep data storage means 47. In the absence of an output from OR gate 65, terminal 68 of bistable circuit 66 is in a "1" condition thereby allowing the data stored in first sweep data storage means 47 to be transferred by transfer means 69, at the end of the second sweep, to the recognition circuits 29 shown in FIG. 1.

Figure 5:
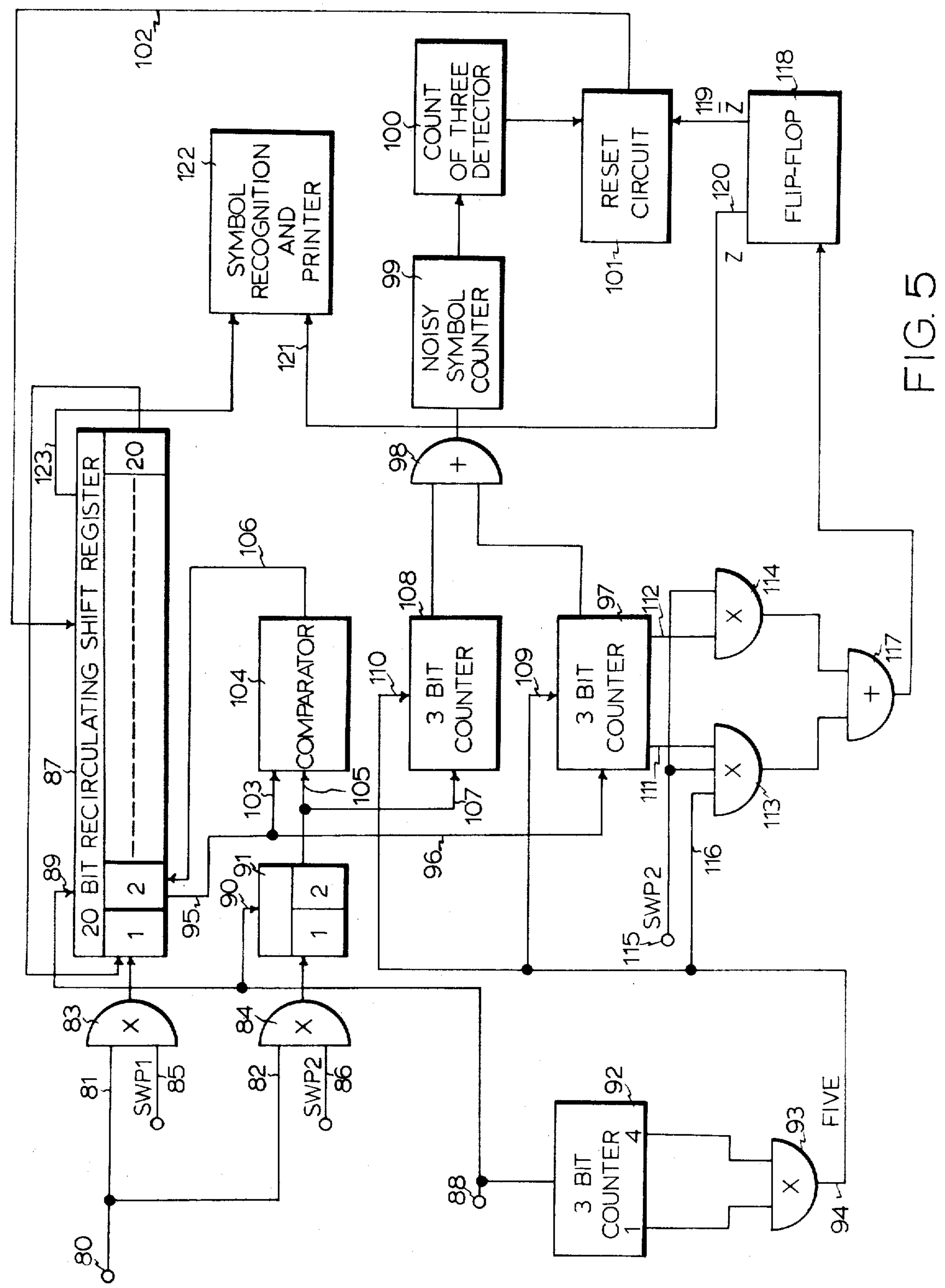
FIG. 5 is a more detailed diagram of a preferred embodiment of the invention.

Referring now to FIG. 5, there is shown a schematic diagram, partially in block diagram form, of a detailed embodiment of the invention. For the purposes of illustrating the structure and operation of FIG. 5, a two out of five code will be assumed. It will also be assumed that the identifying interrogating system identifies or reads only four symbols at a time or in other words that the objects to be identified are identified by a four digit number. Also, for the purposes of this example, excessive noise will be defined as the receipt of four noise bits on any three digits. The returned signal pulses are received on line 80 and fed to input 81 and input 82 of AND gates 83 and 84, respectively. A control signal SWP1 is fed to input 85 of AND gate 83, and a control signal SWP2 is fed to input terminal 86 of AND gate 84. SWP1 and SWP2, as indicated above, are a binary "one" condition during sweeps one and two, respectively. The pulse output of AND gate 83 is fed to a 20 bit recirculating shift register 87.

Input terminal 88 receives a pulse from the clock and control circuitry 23 of FIG. 1 each time sweep pulse oscillator sweeps past one of the twenty possible discrete frequencies shown in FIG. 3. These twenty pulses per sweep on terminal 88 are fed to shift terminal 89 of recirculating shift register 87 and to shift terminal 90 of shift register 91. The twenty pulses per sweep on terminal 88 are also fed to a three bit counter 92. The outputs of the first and third bit positions of counter 92 are fed to an AND gate 93 in order to produce a count of five signal on output terminal 94 of AND gate 93 upon the receipt of pulses into counter 92.

Each time sweep oscillator 22 of FIG. 1 sweeps past one of the discrete frequencies shown in FIG. 3, the contents of recirculating shift register 87 is shifted one position to the right. The condition of the second position in recirculating shift register 87 is sensed on terminal 95 of shift register 87. The signal pulses on terminal 95 are fed by line 96 to a three bit counter 97. The output of the third bit position on three bit counter 97 is fed through OR gate 98 to step a noisy symbol counter 99. Therefore, during the first sweep, noisy symbol or digit counter 99 is counting the number of digits on the first sweep having at least four bits. When noisy symbol counter 99 reaches a count of three, the count of three is detected by count of three detector 100. The output pulse of the count of three detector 100 is fed to reset circuit 101. Reset circuit 101 produces a master reset pulse on line 102 at the end of the sweep to reset recirculating shift register 87 if reset circuit 101 receives a pulse from detector 100 which indicates that three digits have been detected with at least four bits per digit.

If an excessive noise condition was not detected on the first sweep, a second sweep will be generated by sweep oscillator 22 of FIG. 1. Returned signal pulses from the second sweep are received at terminal 80 and applied to input 82 of AND gate 84. Control signal SWP2 will be present on input 86 of AND gate 84 during the second sweep and therefore the returned signal pulses above, the 20 pulses per sweep present on terminal 88 will be applied to shift terminal 90 of shift register 91 thereby causing shift register 91 to shift each time sweep oscillator 22 sweeps past a possible discrete frequency. It is noted that the recirculating shift register 87 and shift register 91 are shifted in unison. The contents of the second bit position of recirculating shift register 87 is taken from terminal 95 and applied to input 103 of comparator 104. The contents of the second bit position of shift register 91 is applied to input 105 of comparator 104. Comparator 104 compares corresponding bit positions on the first and second sweeps. If the number two bit position of recirculating shift register 87 is set and the number two bit position of shift register 91 is reset, comparator 104 will generate a reset signal on line 106 and reset the number two bit position of recirculating shift register 87 for the reason as described above.

The output of the number two bit position of shift register 91 is also fed to input 107 of a three bit counter 108. Three bit counter 108 counts the number of bits per digit or symbol in a manner similar to that of three bit counter 97. It is noted that three bit counters 97 and 108 are reset each time sweep oscillator 22 sweeps past five discrete frequencies by a count of five output pulse generated on output 94 of AND gate 93 and applied to the reset terminal 109 of three bit counter 97 and to the reset terminal 110 of three bit counter 108. The condition of the third bit in three bit counter 108 is fed through OR gate 98 to noisy symbol counter 99 and causes noisy symbol counter 99 to count one pulse each time a noisy digit, more than four bits per digit, is counted on the second sweep. Count of three detector 100 and reset circuit 101 operate in an identical manner on the second sweep to reset recirculating shift register 87 upon the occurrence of an excessive noise condition.

The contents of the second bit of recirculating shift register 87 is fed via terminal 95 and line 96 to three bit counter 97 on the second sweep. Three bit counter 97 and related circuitry to be described operate to insure that recirculating shift register 87 contains only two bits per digit or word after the correction operation by comparator 104. A "1" signal indicative of a count less than two may be present on line 111 from three bit counter 97. A "1" signal is present on line 112 when three bit counter 97 contains a count in excess of three. Line 111 is connected to an input of AND gate 113 and line 112 is connected to an input of AND gate 114. Sweep signal SWP2 is applied to terminal 115 which is connected to inputs of both AND gates 113 and 114. The count of five signal from AND gate 93 is also applied as an input to AND gate 113 via line 116. Therefore, AND gates 113 and 114 may produce an output pulse only during the second sweep, and in addition AND gate 113 will not produce an output until the end of a digit or word. The output of AND gate 113 or 114 is passed through OR gate 117 to set flip-flop 118 when either AND gate 113 or 114 produces an output. AND gate 113 produces an output pulse when any digit in recirculating shift register 87 contains less than two bits, and AND gate 114 produces an output when any digit or word in recirculating shift register 87 contains more than two bits. Thus, if any digit or word in recirculating shift register 87 contains more or less than two bits, flip-flop 118 will be set, producing an output pulse on line 119 which causes reset circuit 101 via line 102 to reset recirculating shift register 87. If flip-flop 118 is not set, an output is generated on line 120 which provides an input on input terminal 121 of the symbol recognition and printer circuitry 122 (well known in the art and not described herein). This allows the data stored in recirculating shift register 87 to be read into the symbol recognition and printer circuitry 122 via line 123.

It will be apparent to those skilled in the art that the noise error correcting and excessive noise rejecting system described herein may be used for correcting or rejecting any binary signal code which uses a constant number of bits for each symbol in the code out of a larger number of possible bit positions for each symbol. It is also apparent that various changes and modifications may be made in the circuitry, or different devices used to produce the same function in the circuit. For example, various types of recirculating digital memories could be used in place of the recirculating shift register, or equivalent logic functions could be used in place of some of the various gating networks. As a further example, it is possible that in certain situations, particularly those in which the environment contains only moderate amounts of noise, the two counter embodiments illustrated may be modified by the omission of the second counter. In this modification the output of the first counter, which recognizes an excess number of bits in a digit would be utilized to directly effect the described rejection of the frequency sweep signal pulse data. Thus, a predetermined number (one or more) of excess bits in a single digit or symbol would cause the rejection of that sweep. This modification would place somewhat stringent conditions on the overall quality of the received signals but would, because of the lesser amount of hardware, result in a less expensive system.

In view of the above, it will be apparent that modifications and variations are possible within the scope and spirit of the above teachings. It therefore is to be understood that within the scope of the appended claims, the invention may be practiced other than as specifically described.

What is claimed as new and desired to be secured by Letters Patent of the United States is:

1. An excessive noise rejecting system for use in a symbol identification interrogation system which utilizes consecutive frequency swept transmitted signals and returned signals at predetermined frequencies determined by an object radiated, every identification symbol being comprised of M bits in N bit positions, wherein N is a larger number than M, comprising;

means for receiving returned signals on said consecutive frequency sweeps and converting said signals to frequency sweep signal pulses on each sweep, respectively;

means for counting the number of signal pulses in the N bit positions of each symbol;

means for generating an excessive noise signal when the count of the number of each frequency sweep signal pulses exceeds a predetermined number; and means for rejecting the frequency sweep signal pulse data upon generation of said excessive noise signal.

2. A noise error correcting and excessive noise rejecting system as recited in claim 1 wherein said means for generating an excessive noise signal comprises:

means for generating a noise pulse whenever the count of the number of frequency sweep signal pulses in the N bit positions of a symbol exceeds a predetermined number; and means for counting said noise pulses on each sweep and generating said excessive noise signal when the count of said noise pulses on any one of said sweeps equals a predetermined number.

3. A noise error correcting and excessive noise rejecting system for use in a symbol identification interrogation system which utilizes consecutive frequency swept transmitted signals and returned signals at predetermined frequencies determined by an object radiated, every identification symbol being comprised of M bits in N bit positions, wherein N is a larger number than M, comprising:

means for receiving returned signals on a first and a second frequency sweep and converting said signals to first frequency sweep signal pulses and second frequency sweep signal pulses, respectively;

means for counting the number of signal pulses in the N bit positions of each symbol;

means for storing said first frequency sweep signal pulses produced on said first frequency sweep;

means for generating a noise pulse whenever the count of the number of first frequency sweep signal pulses in the N bit positions of a symbol exceeds a predetermined number;

means for counting said noise pulses on said first and second frequency sweeps and generating an excessive noise signal when the count of said noise pulses on said first or said second sweep equals a predetermined number;

means for rejecting the frequency sweep pulse data upon generation of said excessive noise signal on said first or said second frequency sweep; and comparator means for comparing said second frequency sweep signal pulses with corresponding first frequency sweep signal pulses stored in said storage means and for cancelling a first frequency sweep signal pulse stored in said storage means upon a corresponding signal pulse being absent from said second frequency sweep.

4. A noise error correcting and excessive noise rejecting system as recited in claim 3 wherein said storage means is a recirculating storage means.

5. A noise error correcting and excessive noise rejecting system as recited in claim 4 further comprising:

counting means for counting the number of signal pulses per N bit positions of a symbol stored in said recirculating storage means; and means for rejecting the signal pulse data stored in said recirculating storage means if said counting means contains a count other than M after sensing N bit positions of a symbol in said recirculating storage means.

6. A noise error correcting and excessive noise rejecting system as recited in claim 3 wherein said storage means is a recirculating shift register means.

7. A noise error correcting and excessive noise rejecting system as recited in claim 6 further comprising:

counting means for counting the number of signal pulses per N bit positions of a symbol stored in said recirculating shift register means; and means for rejecting the signal pulse data stored in said recirculating shift register means if said counting means contains a count other than M after sensing N bit positions of a symbol in said recirculating shift register means.

* * * * *